United States Patent
Rossow et al.

(10) Patent No.: US 7,548,804 B2
(45) Date of Patent: Jun. 16, 2009

(54) EMULATION TO PROVIDE MULTIPLE APPLICATIONS IN MOBILE EQUIPMENT

(75) Inventors: Matthew J. Rossow, Dos Palos, CA (US); Michael L. O'Connor, Redwood City, CA (US); David G. Lawrence, Santa Clara, CA (US)

(73) Assignee: Novariant, Inc., Fremont, CA (US)

( * ) Notice: Subject to any disclaimer, the term of this patent is extended or adjusted under 35 U.S.C. 154(b) by 726 days.

(21) Appl. No.: 11/134,166

(22) Filed: May 19, 2005

(65) Prior Publication Data

US 2006/0271348 A1     Nov. 30, 2006

(51) Int. Cl.
    *G06F 7/00* (2006.01)
(52) U.S. Cl. .................. 701/36; 701/50; 701/200; 701/207; 701/41; 340/990
(58) Field of Classification Search .......... 701/33, 701/36, 41, 200, 207, 209, 211, 212, 50; 340/988, 990, 995.12, 995.19
    See application file for complete search history.

(56) References Cited

U.S. PATENT DOCUMENTS

| | | | |
|---|---|---|---|
| 5,333,256 A * | 7/1994 | Green et al. ............... 715/772 |
| 5,717,596 A | 2/1998 | Bernard et al. | |
| 5,949,975 A | 9/1999 | Batty et al. | |
| 6,223,212 B1 | 4/2001 | Batty et al. | |
| 6,298,318 B1 * | 10/2001 | Lin ............................ 703/23 |
| 6,438,468 B1 * | 8/2002 | Muxlow et al. ............... 701/3 |
| 6,701,378 B1 | 3/2004 | Gilhuly et al. | |
| 6,727,918 B1 | 4/2004 | Nason | |
| 6,728,896 B1 | 4/2004 | Forbes et al. | |
| 6,753,873 B2 | 6/2004 | Dixon et al. | |
| 6,807,529 B2 | 10/2004 | Johnson et al. | |

OTHER PUBLICATIONS

"Two on One An application Programming Interface hosts Precision Guidance Controller on the GPS Receiver and Helps Reduce Soil Compaction," by GPS World—Designing and Implementing Solutions With Global Positioning Technologies; www.gpsworld.com; Jan. 2004; pp. 14-18.
Operating System Solutions—Running Windows of Linux/UNIX Software on a Macintosh and Running Mac OS on other Platforms; Operating Systems: WIN/Unix on Mac, Mac on Others; http://www.macwindows.com/emulator.html; printed on May 2, 2005; 13 pages.
Tractors and Machinery for Agriculture and Forestry—Serial Control and Communications Data Network—Part 6 Virtual Terminal; International Organization for Standardization, 2000 and pp. 150-11783.

* cited by examiner

*Primary Examiner*—Gertrude Arthur Jeanglaud
(74) *Attorney, Agent, or Firm*—Brinks, Hofer, Gilson & Lione

(57) ABSTRACT

To reduce the number of processors and/or displays in mobile equipment, an operating system is emulated in one example. A primary operating system runs on a processor or uses a particular display. The emulated operating system shares the same processor and/or same display. The emulation allows use of applications drafted or written for different operating systems in a common or shared environment. As another example, a virtual terminal function is emulated on a particular device. The particular device interacts with additional sources of information for displaying images on a same display. Using emulated operating systems or virtual terminals, a navigation program is used in a vehicle. An additional program is run on the same processor or shares the same display in the same vehicle at substantially the same time.

54 Claims, 5 Drawing Sheets

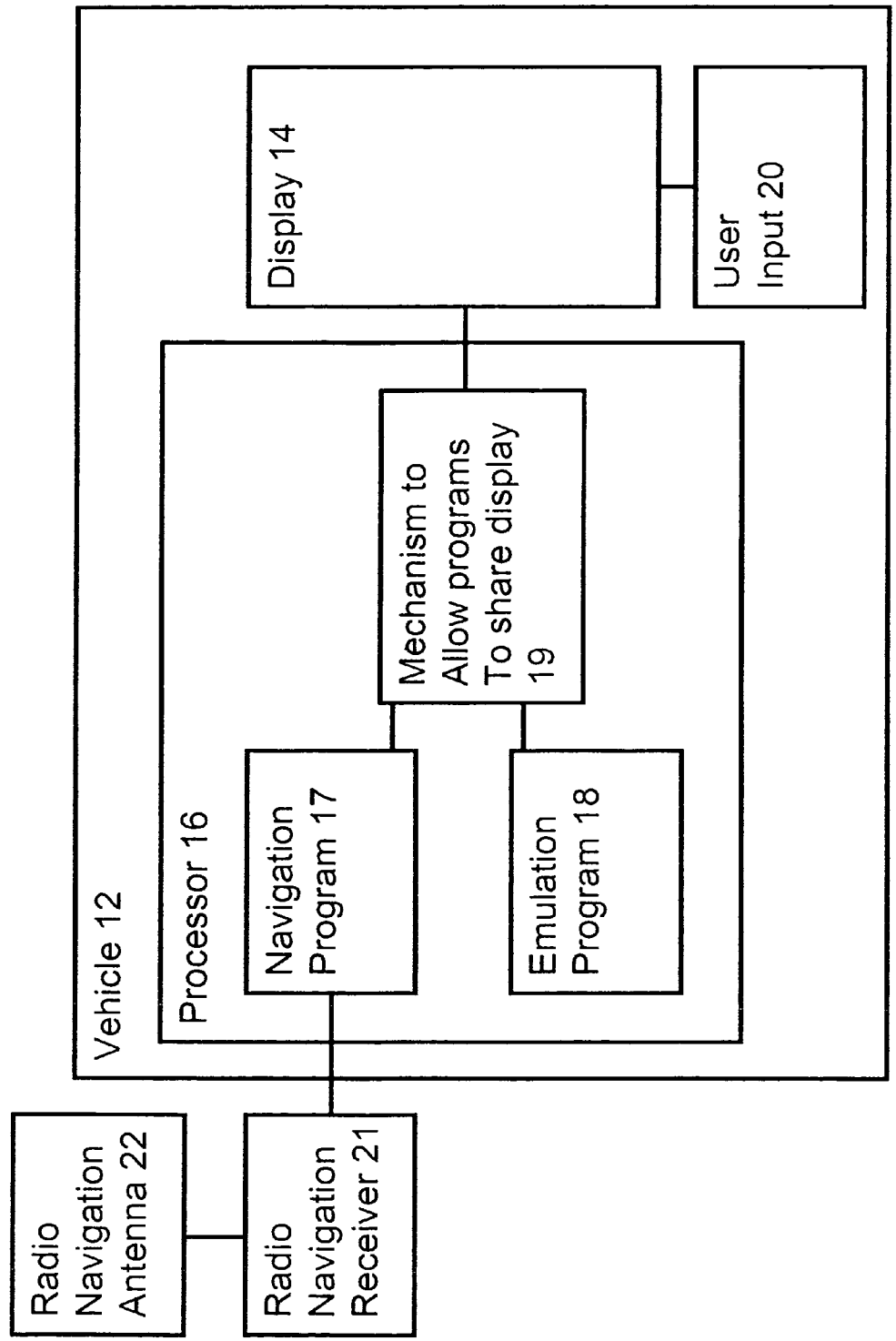

EMULATION TO PROVIDE MULTIPLE APPLICATIONS IN MOBILE EQUIPMENT

BACKGROUND

The present invention relates to running multiple applications in mobile equipment. For example, an application or device is emulated for use in a vehicle.

Navigation receivers are used in vehicles to assist in various operations. For example, a navigation receiver is connected to a farming vehicle for automatically steering during plowing, planting, harvesting or other uses. Other devices may also be provided in the equipment, such as displays and associated processors for indicating operation of various vehicle components. In the farming example, separate displays for operation of the vehicle and operation of attached components, such as sprayers, are provided. The different processors and associated programs provide information to the user using the same or different operating systems independently run on each device. For example, a navigation receiver operates pursuant to a Linux operating system, and an application for controlling spraying of herbicides or pesticides operates pursuant to a Palm or Pocket PC operating system. As more software applications become available in farming equipment, additional devices are provided. The inside cab of the farming vehicle becomes overwhelmed with different devices. Similarly, mining and construction vehicles may have a plurality of different devices and associated displays for different applications. The applications are associated with operating systems chosen by the device manufacturer. Likewise, other vehicles, such as cars or buses, have an increasing number of displays and associated devices.

To limit display confusion in heavy industrial and agricultural equipment, ISO 11783 provides for a virtual terminal. A monitor hosts images associated with one or more different sources. Different pieces of equipment or devices output data in a standardized format for display on a virtual terminal. However, the use of a standard format by the virtual terminal may limit the available types of display or display information.

BRIEF SUMMARY

By way of introduction, the preferred embodiments described below include methods and systems for emulating an application or device in mobile equipment. To reduce the number of processors and/or displays in one example, an operating system is emulated. A primary operating system runs on a processor or uses a particular display. The emulated operating system shares the same processor and/or same display. The emulation allows use of applications drafted or written for different operating systems in a common or shared environment. As another example, a virtual terminal function is emulated on a particular device. The particular device interacts with additional sources of information for displaying images on a same display. In one embodiment using emulated operating systems or virtual terminals, a navigation program is used in a vehicle. An additional program is run on the same processor or shares the same display in the same vehicle at substantially the same time.

In a first aspect, a method is provided for emulating an application or device in mobile equipment. A navigation program is run in a vehicle. An emulation program is also run in the vehicle.

In a second aspect, a system is provided for emulating an application or device in mobile equipment. A display is provided in or on the vehicle. A processor connects with the display. The processor is operable to run a first program. An emulation program shares the display with the first program.

In a third aspect, a system is provided whereby a virtual terminal emulator and an application reside on a same platform. A display of the platform is operable in response to the virtual terminal emulator and the application.

In a fourth aspect, a method is provided for emulating an application or device in mobile equipment. A first program is run within a first operating system. A second program is run within the first operating system, in real time with the running of the first program, the second program being a second operating system. The first and second operating systems share a display. At least the first program is associated with navigation, such as satellite navigation.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

FIG. 1A is a block diagram representation of a system for emulating an application or device in mobile equipment;

DETAILED DESCRIPTION OF THE DRAWINGS AND PRESENTLY PREFERRED EMBODIMENTS

A navigation program and an emulation program operate on a single platform, typically included in a vehicle, to optimize space and efficiency. A platform is any collection of hardware and software working together as a system. In one embodiment, one or more such programs share a same processor and/or display. For example, a processor running a primary operating system hosts a secondary operating system. The same platform may run applications written for different operating systems. For example, a navigation receiver is used with an auto steer system. In response to location information, the auto steer system outputs or automatically steers the vehicle. Other applications, such as a variable rate program for sprayers from Farm Works or other sources, are emulated or run on the same platform by emulating a different operating system. The navigation receiver operates pursuant to a Linux system and the variable rate program operates pursuant to a Pocket PC operating system. The different applications are operable substantially simultaneously by hosting both operating systems on the same platform. As another example of emulation, a virtual terminal is integrated with one or more other applications on a same platform, such as a navigation receiver or auto steer application. The emulation program emulates the virtual terminal for displaying information from one or more different sources or other devices. The application operating on the same platform may provide enhanced display characteristics not available pursuant to a virtual terminal display format. Other examples are possible by emulating a program, such as an operating system, or a device, such as a virtual terminal application.

Figure 1B:
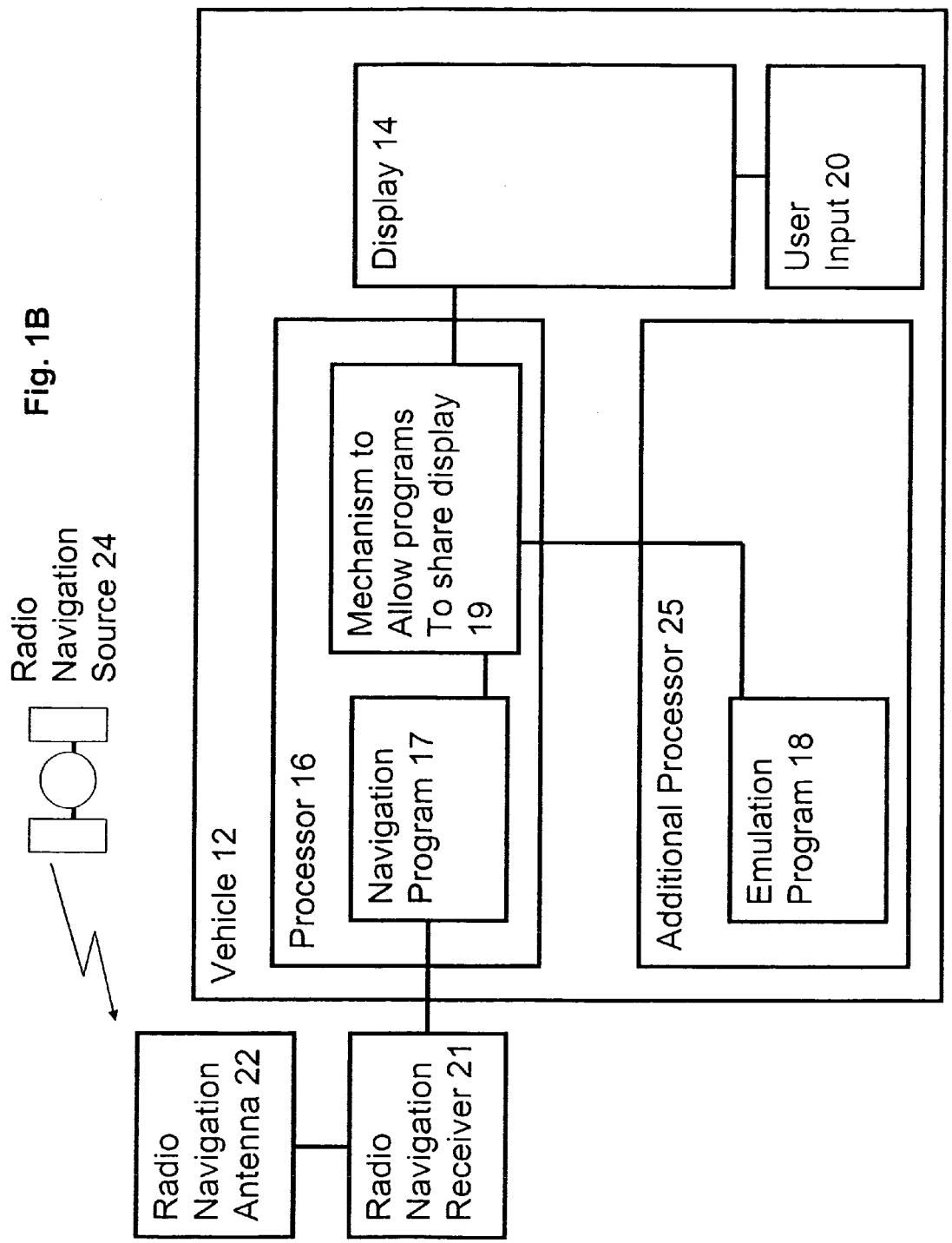
FIG. 1B is a block diagram representation of a system for emulating an application or device in mobile equipment which uses two processors.

FIG. 1A shows one embodiment of a system 10 for emulating a program or device in mobile equipment. While shown and described for use in mobile equipment, the system 10 may be implemented in non-mobile devices, such as a reference station, monitoring station, central facility or other location. The system 10 as shown in FIG. 1A includes a vehicle 12, a display 14, a processor 16, a navigation program 17, an emulation program 18, a display controller 19, a user input 20, a radio navigation receiver 21, a radio navigation antenna 22 and a radio navigation source 24. Additional, different or fewer components may be provided. For example, the system 10 is free of the radio navigation components 21, 22, and 24. In this case, navigation may be a function of one or more of: inertial navigation, dead reckoning, map matching, laser location, and/or user input. As another example, the system 10 is free of the user input 20 and/or the vehicle 12. As yet another example, which is shown in FIG. 1B, one or more additional processors 25 may be provided in the vehicle 12 or in attachments to the vehicle 12, such as plows, planters, sprayers, graders, lifters, trailers, or other now known or later developed farming, mining or construction implement for a vehicle 12. While the user input 20, display 14, and processor 16 are shown within the vehicle 12, one or more of these components may be positioned on implements attached to the vehicle 12 or at locations remote from the vehicle 12, such as providing for wireless communications from the processor 16, user input 20 or antenna 22 to the in-vehicle display 14.

In one example, the radio navigation source 24 is one or more satellites, such as GPS, GLONASS, and/or Galileo satellites. In this example, the radio navigation receiver 21 and the radio navigation antenna 22 are a satellite navigation receiver and antenna. In other examples, radio navigation sources include pseudolites, synchrolites, or any other radio sources, such as Wi-fi nodes, Bluetooth sources, LEO satellites, television broadcast signals, and/or any other source of radio signals.

The vehicle 12 is a car, bus, truck, train, boat, airplane, farm implement, construction vehicle, mining vehicle, other heavy industrial or agricultural equipment, or structure on a mobile platform, such as on a tectonic plate. The vehicle 12 is a single device or includes one or more additional components, such as a trailer, or implement. Implements may be mounted on the front, side or rear of the vehicle 12. In other embodiments, the mobile equipment for use with the system 10 is a hand-held device, such as a hand-held navigation receiver. The vehicle 12 is operable to move or change positions relative to the earth. For example, rapid movement provided by race cars, slower movement provided by heavy equipment or agricultural equipment or slow movement provided by reference stations positioned to detect tectonic or other ground based movement is provided.

The display 14 is a monitor, CRT, LCD, plasma screen, projector, flat panel, heads-up display or other now known or later developed display. The display 14 is positioned within the vehicle 12. Alternatively, the display 14 is mounted on the vehicle 12, such as positioned on an exterior of the vehicle or on or within an implement connectable or connected with the vehicle 12. In one embodiment, the display 14 is a color touch screen in a user or operator cabin of the vehicle 12.

The processor 16 is an application specific integrated circuit, general processor, field programmable gate array, digital signal processor, analog circuit, digital circuit or other now known or later developed device for processing analog and/or digital data. In one embodiment, the processor 16 is a Pentium, MPC 5200 or other processor running a multi-tasking operating system, such as Linux or Windows®. The processor 16 connects with the display 14. A direct or indirect connection may be provided, such as a connection through one or more cables or within a same housing, or an RF connection active within the cab or a compartment of a vehicle. The processor 16 is operable to select a display format on the display 14. The processor 16 controls the display 14, such as through use of the operating system and/or display buffers.

The display controller 19, such as a software program, hardware or both software and hardware, is provided within the processor 16 to control what appears on the display 14. By controlling the display 14, the processor 16 causes different information from different programs to be displayed on the display 14. The information from different programs is displayed simultaneously or in sequence. Some information may be highlighted or displayed in a larger format than other information, such as highlighting a particular image from a given or desired program while providing a smaller display of information from a different program. Such a display controller 19 to allow programs to share the display 14 is often referred to as "picture-in-picture". If the information is displayed in sequence, then the display controller 19 may rely on an external signal, such as a user input, a timer, or an alarm, to determine what to display at a given point in time.

The processor 16 is operable to run one or more programs. In one example, the processor 16 is able to run one or more programs by running these programs in the context of a primary operating system, such as Linux, Windows®, UNIX, Palm, Pocket PC or other now known or later developed operating systems. As one example, the processor 16 is operable to run an application, such as a navigation, mining, construction, or farming related application.

The emulation program 18 is software, firmware, hardware, or combinations thereof, that implements the interface characteristics of a program (i.e. an application program or an operating system) or a device. In one embodiment, the emulation program 18 is operable to emulate one or more programs or devices, such as applications or operating systems. The emulation program 18 is run on the processor 16 with other applications and/or operating systems. The processor 16 secondarily hosts (emulates) the second operating system or application while running a first operating system and/or application. By running a primary operating system and hosting a secondary operating system, the processor is operable to run different applications written for the different operating systems substantially simultaneously or without rebooting the processor 16. Substantially simultaneously includes sequential operation at speeds associated with a processor clock, such as 40 MHz or greater. Different function calls are processed sequentially based on priorities or time of generation. As another example, the emulation program 18 runs on the processor 16 as an application operable in a single or same operating system implemented by the processor 16 for other applications. For example, the emulation program 18 emulates a virtual terminal or other hardware or software device.

In an alternative or additional embodiment, the emulation program 18 runs on a separate processor than the processor 16. The separate processor is provided in a same platform or a different platform. For example, as shown in FIG. 1B, the emulation program 18 runs on an additional processor 25 connected to a same circuit board as the processor 16. As another example, the emulation program 18 runs on a processor in a separate device, such as running on a processor provided in a hand-held personal digital assistant (PDA). The display controller 19 to share the display 14 is within the processor 16, the additional processor 25, separate from both processors 16, 25 or combinations thereof.

With or without sharing the processor 16, the emulation program 18 may be operable to share the display 14 with other programs through the display controller 19. Where two operating systems are provided, the display controller 19 allows the emulated operating system to share control of the display 14 with the primary operating system. The applications run on the two different operating systems are operable to share the display substantially simultaneously. For example, information from different applications is combined by the display controller 19 onto a common graphic user interface or within a common image. As another example, different portions of the display screen are dedicated to different applications. In alternative embodiments, the display is shared sequentially, such as providing images associated with one program after images associated with a different program. The different information may be provided in real time by switching between the two programs without rebooting.

In yet another embodiment, the emulation program 18 is provided on the processor 16 and shares the display 14. In yet another embodiment, the emulation program 18 is provided on the processor 16 but uses a separate or different display.

The user input 20 is a touch screen, color touch screen, keyboard, dial, mouse, joystick, RF pointing device, trackball, knobs, buttons, sliders, touch pad, capacitive sensor, resistive sensor, combinations thereof, or other now known or later developed user input devices. The user input 20 is provided as part of a single platform, such as associated with the display 14, or distributed on different platforms or devices, such as on a navigation receiver and a separate personal data assistant or personal computer.

The radio navigation receiver 21 may be a satellite receiver, such as a receiver operable at global positioning system L1 and/or L2 and/or L5 frequencies. One or more radio navigation receivers 21 may be used in the system. Similarly, while shown with a single radio navigation antenna 22, a plurality of different antennas may be provided with each radio navigation receiver 21. For example, one or more radio navigation antennas 22 are provided on the vehicle 12 while one or more additional radio navigation antennas 22 are provided on an attached implement. The antennas are operable to receive satellite navigation signals from one or more radio navigation sources 24, such as satellites, a synchrolites and/or pseudolites. Any satellite navigation system may be provided, such as the Global Positioning System, Galileo, or GLONASS. In yet other embodiments, the radio navigation receivers 21 receive signals from one or more pseudolites or synchrolites provided on land, or any number of other radio sources.

The processor 16 and any additional processors 25 implement or run programs. The programs include software, firmware, hardware or combinations thereof that implement a process. Programs include applications, operating systems or other processes.

In one embodiment, a program implemented by the processor 16 is a navigation program 17. A navigation program is any program that uses navigation information (i.e. any program in which position or orientation information is used). The processor 16 may be part of a radio navigation receiver 21 or other navigation related platform for use of satellite signals. A location of the radio navigation antenna 22 and associated vehicle 12 is computed by the radio navigation receiver 21 based on satellite or other radio signals. Further processing of the location information may be provided. For example, the navigation program 17 is an automated steering application. The location of the radio navigation antenna 22 is used to determine the location of the vehicle 12. The vehicle 12 is automatically steered in a desired direction of travel by a processor and actuators. Other navigation programs 17 include steering guidance programs. A display indicates a desired direction of steering to the user based on location. Yet other navigation programs 17 include as-applied map generator programs, fixed or variable rate sprayer or spreader control programs, seed application programs, yield monitoring programs, boom section control programs, cut-fill map generator programs, field leveling programs or combinations of any of the applications discussed herein. Navigation programs 17 may generate real time images on the display 14. As the vehicle 12 changes locations, the navigation program 17 updates the image provided to the display 14 to indicate the change and any result associated with the change. In alternative embodiments, the emulation program 18 runs one or more of the programs described above as a navigation program.

The emulation program 18 is a program different than the navigation program 17. In one embodiment, the emulator program 18 is implemented by the processor 16. In another embodiment, the emulator program 18 is implemented in an additional processor 25. For example, the navigation program 17 is a farming, mining or construction application that uses navigation related information. In one embodiment, the navigation program 17 operates a component of the vehicle 12. For example, motors for spraying in an attached sprayer are controlled using a spray rate control program. Other heavy equipment related applications include automatic steering, blade control, bucket control, yield monitors, topographic maps, data entry, or combinations thereof. For example, a data entry application is provided for monitoring live stock. As the user of the vehicle notices information about live stock or information about live stock is electronically detected, the application may be used to maintain a data base of corresponding information. Other applications may be implemented by the emulation program 18, such as vehicle monitoring, engine monitoring, television tuning, business applications, email, stock or trading applications, word processing, spread sheet, data base management, or other now known or later developed applications. For example, the vehicle 12 is a passenger automobile with a navigation program 17, a vehicle performance application (e.g., number of miles traveled, direction of travel, mileage, and/or range), and television tuning applications implemented by the processor 16 running the emulation program 18.

Figure 1C:
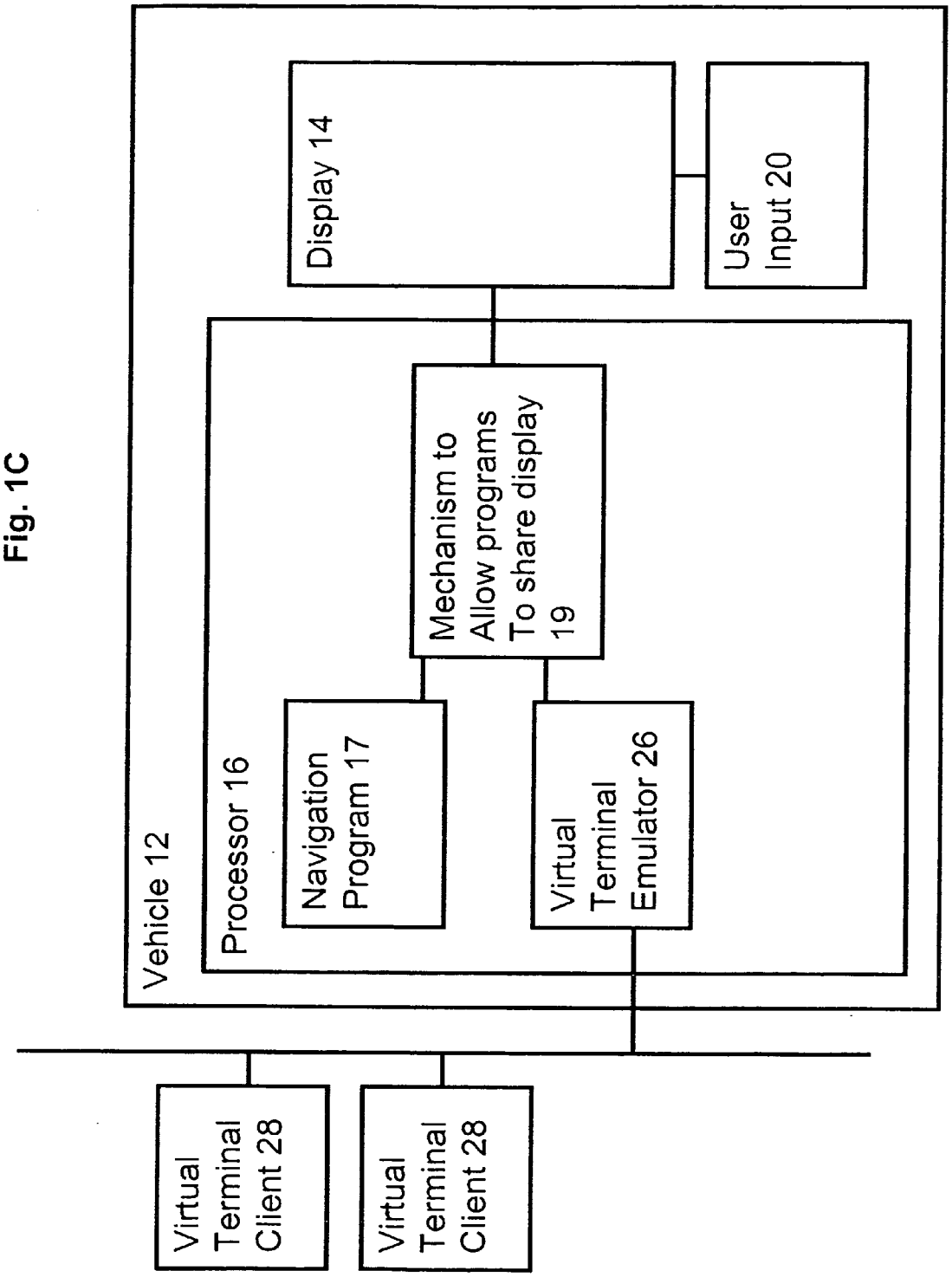
FIG. 1C is a block diagram representation of a system for emulating a second operating system in mobile equipment.

In one embodiment, shown in FIG. 1C, the emulation program 18 is a virtual terminal emulator 26. A virtual terminal emulator is an emulation program that implements the interface characteristics of a virtual terminal device. The virtual terminal emulator 26 is operable to generate an image for the display 14. The virtual terminal emulator 26 is implemented on the processor 16 or on an additional processor 25. The virtual terminal emulator 26 connects to one or more virtual terminal clients 28. The connection is a bus, network, modem, wireless device or other connection for sending and/or receiving information. The virtual terminal emulator 26 is operable to generate images responsive to the different sources. In one embodiment, the virtual terminal program operates pursuant to the ISO-11783 standard. The standardized format or expected inputs are provided so that multiple different sources, platforms or devices may use the same display 14.

Figure 2:
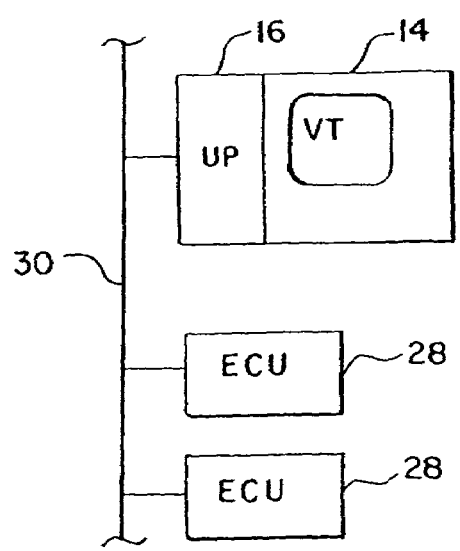
FIG. 2 is a block diagram of one embodiment of an emulation program for a virtual terminal.

FIGS. 1C and 2 show embodiments of the processor 16 running a virtual terminal emulator for the display 14. The processor 16 is part of a navigation receiver, or other platform for running applications for the vehicle 12. The processor 16 and associated display 14 provide an interface or functionality beyond display of images from one or more sources pursuant to a "dumb" or virtual terminal specification or program. Specialized software, such as a navigation program 17, may be run on the same hardware, such as the processor 16 and display 14, that also supports the virtual terminal emulator 26. Where more advanced applications are provided for implementation of the processor 16 or for presentation on the display 14, the virtual terminal functionality as well as the more advanced images or processing may be provided. For example, a virtual terminal program may be inoperable with one or more additional programs to meet customer needs or desires for real time or other display of steering guidance, as-applied maps, real time variable rate maps or cut-fill maps. Such additional programs are implemented on the processor 16 while still allowing virtual terminal functionality for use of the same display 14 of information from one or more virtual terminal clients 28, such as electronic control units (ECUs).

One or more virtual terminal clients 28 are connect through a CAN bus, other bus, or other connector 30 to the processor 16 that emulates the virtual terminal program. The virtual terminal clients 28 communicate any of various desired information. For example, a task controller ECU is provided. Other ECU examples include a yield monitor, a boom section controller, a visual guidance system, an automated steering system, a GPS receiver, a bucket scraper elevation control system, an engine controller, a transmission controller, a brake controller, a hitch controller, a vehicle controller, or implement controllers. The ECUs connect through a CAN port or other connection on the bus or other structure to the processor 16.

The virtual terminal emulator 26 and navigation program 17 may be integrated within the same software, operated as two separate applications on a same processor or implemented as different programs or applications on different processors connected with the same display 14. A virtual terminal client 28 or other source of information provides image data for display on the display 14. The display 14 is operable to display information from different programs substantially simultaneously. For example, information from a navigation program 17 is displayed. Information received from a virtual terminal emulator 26 is displayed adjacent to the information from the navigation program 17 at a same time on the display 14. Alternatively or additionally, the processor 16 or display 14 is operable to transition between an image associated with one program and an image associated with another program. For example, a user turns a knob, touches the screen or otherwise selects information from one source, such as the navigation program 17 or virtual terminal emulator 26, for a full screen display. In response to other user input, the transition to image information from a different source is selected. The user changes the channels or selects between images associated with different applications. Similarly, the user may select between emphasizing images associated with different applications, such as displaying a navigation program 17 image in a larger portion of the display 14 than one or more images associated with the virtual terminal emulator 26.

As an alternative to changing in response to user input, a transition may be provided between images or for emphasizing one image over another in response to an alert. For example, the navigation program 17 running on the processor 16 identifies an error, a danger, a selected event, or other occurrence. The user is alerted by transitioning to an image associated with the navigation program 17 or by highlighting an image associated with the navigation program 17. In addition or as an alternative to transitioning between images or highlighting images, a notice may be provided overlaying or beside a currently displayed image indicating the existence of information or an alert and associated with a different application. As another example, three channels or sources of display information are provided, such as one application being resident on the processor and two ECUs for interacting with a virtual terminal emulator 26. When one of the applications, such as an ECU related application, identifies an alert condition, the information from the ECU identifying the alert condition pre-empts other images on the display 14 in accordance with the virtual terminal program format.

Figure 1D:
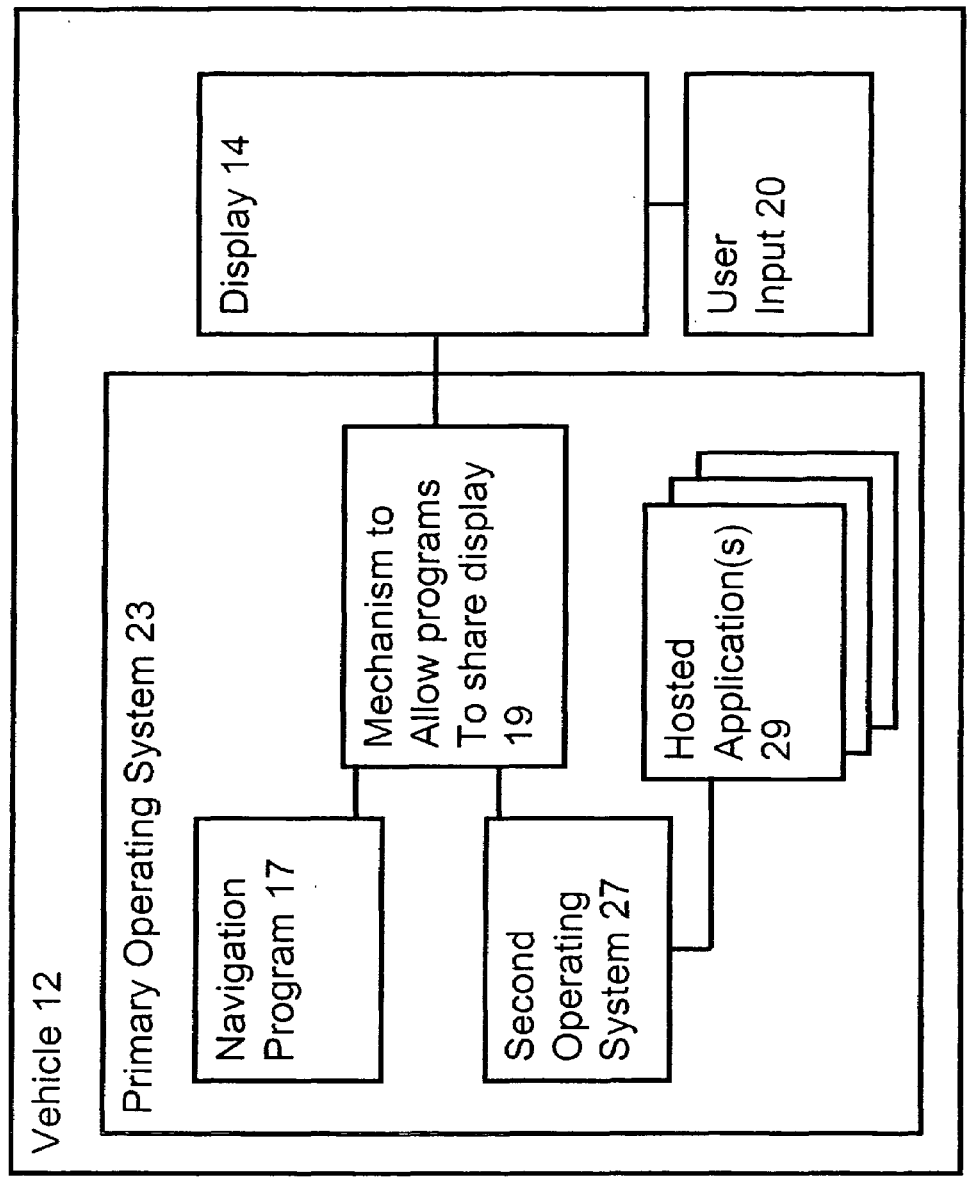
FIG. 1D is a block diagram representation of a system for emulating a virtual terminal in mobile equipment.

Referring now to FIG. 1D, in another embodiment, the emulation program 18 run by the processor 16 is a second operating system 27. For example, the processor 16 is part of a navigation receiver or other platform operating with a Windows® or Linux primary operating system 23. The processor 16 is also operable to run one or more applications pursuant to the primary operating system 23, such as applications written to interact or operate with the primary operating system 23—for example, the navigation program 17.

The emulation program 18 operates pursuant to a second operating system 27. For example, the emulation program 18 emulates a Pocket PC or Palm operating system. The emulated second operating system 27 is operable to run one or more hosted applications 29. The hosted applications 29 are written for use with the second operating system 27. Examples of popular emulation programs include POSE (Palm Os Emulator), vmware (an x86 "virtual machine" on top of which second operating systems may run), and wine (an open source implementation of the Windows API on top of X and Unix).

The two operating systems operate substantially simultaneously. In one embodiment, both operating systems share a same processor 16. In additional or alternative embodiments, both operating systems share a same display 14. For example, different applications are run on different operating systems substantially simultaneously by the same processor 16 and/or with the same display 14. Substantial simultaneous or real time use by both operating systems allows for different applications to be run without rebooting or reconfiguring the processor 16 or the display 14 to operate with the different operating systems.

Function calls associated with the navigation program 17 and the second operating system 27 in a shared processor 16 embodiment are assigned different priorities. For example, the priority of the second operating system 27 is lower than the priority associated with the navigation program 17. Since operating systems control input and output functions, such as information to be provided to the display 14, the display controller 19 is provided for allowing the interaction of the two operating systems to control the same hardware. Using predetermined programming or current sensing, the primary operating system 23 associated with the host device, such as the processor 16, is identified. When implementation of an application operable with a second operating system 27 is desired by a user, the second operating system 27 associated with the application is identified. The identification may be provided by installing a module associated with the specific application and associated operating system, by processing data associated with the application to determine the desired operating system, by user selection, or from other sources.

The primary operating system 23 or an application running on the primary operating system 23 provides a program or coding for emulating the second operating system 27 with the primary operating system 23. For example, the primary operating system 23 controls some or all of the hardware, such as the display 14, but includes coding to receive function calls for operating hardware from the emulated or second operating system 27. The coding establishes sharing protocols for sharing hardware. Hardware control may be provided to the secondary or emulated operating system 27 where the primary operating system 23 does not currently use the hardware. The control of the display 14 may be divided between the two or more operating systems as a function of time, such as associated with switching between different images for different applications operable on the different operating systems. As an alternative or in addition to control as a function of time, the control of the display 14 is provided as a function of display location. The primary operating system 23 is allocated a portion of the display area, and the emulated second operating system 27 is provided a different portion of the display area. The operating systems then interact with one or more drivers to generate different images on the display substantially simultaneously. The primary operating system 23 converts hardware calls from the second operating system 27 to provide control of the display 14 by the primary operating system 23 but an image with the look and feel associated with the second operating system 27.

The user inputs, such as display buttons, knobs or dials on a touch screen, are provided on the same display 14 at different times or in different areas. Alternatively, the user interactive components or image components associated with the two different operating systems are integrated into a common user interface. For example, one or more buttons are provided using either the primary operating system 23 or second operating system 27 to minimize or maximize display of applications or information associated with one operating system relative to another operating system, such as switching between full size display similar to picture-in-picture operation on a television.

In addition to identifying the two operating systems for implementing code to share the display 14 and/or the processor 16, the identification of the operating systems provides for booting up and shutting down the device. The primary operating system 23 is altered to turn on or off the emulation of the second operating system 27. For example, a boot sequence of the primary operating system 23 is altered to include running the second operating system 27. As another example, a function called during later operation of the primary operating system 23 is provided for starting emulation of the second operating system 27. Prior to turning off or shutting down the primary operating system 23, the secondary operating system 27 is turned off or shut down.

In one embodiment, separate processors are provided for the navigation program 17 and the emulation program 18. The display 14 is shared. For example, the emulation program 18 outputs image information. The processor 16 which is running the navigation program 17 intercepts the output image information and controls the display 14 to display the image from the navigation program 17 or the emulation program 18. User input may be also shared. For example, a user may use the user input 20 and the display 14 to interact with either application from a primary operating system 23 or with an application image provided by the emulation program 18. Any user interaction is fed back to the emulation program 18. Alternatively, user interaction is fed back to the program which has control of the display 14. Alternatively, user interaction is fed back to the appropriate program based on which user input, such as which button or which location on the touch screen, is selected.

In a combination of embodiments, a virtual terminal emulator 26 is implemented using an application operable with the first operating system. A platform or device hosting the display 14 or the processor 16 is implemented with one or more applications operable with a different operating system. The virtual terminal is emulated on the device with an emulated operating system.

Figure 3:
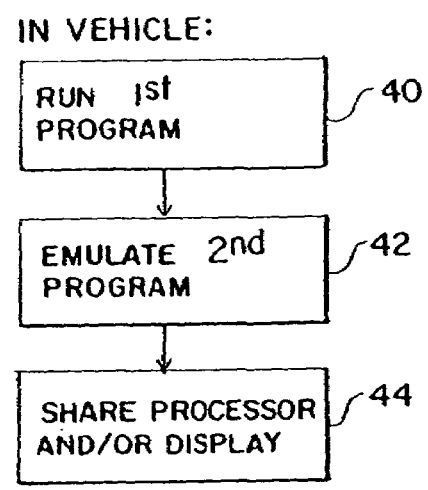
FIG. 3 is a flow chart diagram of one embodiment of a method for emulating a program.

FIG. 3 shows one embodiment of a method for emulating one or more programs in mobile or other equipment. The emulation is provided on a device for changing positions, such as a vehicle. Applications in addition to a navigation application are provided. The navigation or other applications are emulated to simplify the number of devices, processors or displays. The method is implemented on the systems described above for FIG. 1, FIG. 2 or a different system. Additional, different or fewer acts than shown in FIG. 3 may be provided. The acts may be performed in the same or different order as shown.

In act 40, a navigation or other program is run in a vehicle. For example, position information is processed. The position information is determined as a function of satellite signals. The position corresponds to the position of the vehicle or an associated implement. For example, the navigation program is a steering guidance program, as-applied map generator program, a variable rate map generator program, a cut-fill map generator program, combinations thereof or other now known or later developed program using satellite navigation signals. As a steering navigation program, the application is run to automatically steer the vehicle as a function of the current position. As yet another example, the navigation program implements a simple global positioning system navigation receiver for determining a location of a corresponding antenna.

The navigation or other program is operable to generate real time images on the display in the vehicle. For a navigation program, the real time images are generated as a function of a position of the vehicle. For example, location of a vehicle relative to landmarks, a map, or reference stations is displayed. Other status information associated with the application, such as an altitude above or below grade, a number of satellites for which signals are being received or other navigation information is included or displayed with the images.

In one embodiment, the navigation program is hosted on a navigation platform. For example, a navigation receiver having outputs for connections with antennas and a corresponding display is provided. The navigation receiver includes an extra processor or shared processor for running the navigation application and also identifying a location from received satellite signals. The navigation program outputs display information to a display of the navigation receiver.

In act 42, a different program is emulated in the vehicle or mobile device. The emulation provides for integration of different applications on a same platform or sharing a same display. For example, the emulated program as well as the program of act 40 shared a display in act 44. Display information from both programs is provided in the vehicle at substantially the same time or at different times but on the same display. For sharing a processor, the emulated program is run by the same processor as another program. For example, the navigation platform emulates a different program to provide the functionality associated with the program. Farming, mining, construction or other applications are emulated. Any other applications may be free of or use data from the application running in act 40, such as a navigation application. Different applications perform different functions. For example, the navigation application running act 40 is associated with automated steering or guided steering of the vehicle. An emulated application controls operation of other components of the vehicle, such as controlling an implement of the vehicle.

In one implementation of the process shown in FIG. 3, an operating system is run in act 40, and a different operating system is emulated in act 42. Both operating systems are run in real time or substantially simultaneously. Substantially simultaneously accounts for sequential processing but at speeds associated with computer or processor actions. For example, a navigation program runs with a first operating system, such as Linux. A different program runs with a different operating system, such as a Palm, Pocket PC or Windows® operating system.

The different operating systems share a processor, a display or both processor and display. Other hardware may alternatively or additionally be shared between different operating systems. In one embodiment, at least one program operable with one of the operating systems is associated with satellite navigation. In alternative embodiments, additional programs or no programs are associated with satellite navigation.

For implementing different programs on a same processor or platform, such as provided in a same device, an operating system is emulated on the processor. Emulation of a secondary operating system as well as running a primary operating system allows substantially simultaneous running of applications written for two or more different operating systems. The processor hosting the emulated operating system also runs in the primary operating system. Software, filmware or hardware interaction between the operation systems allows assignment of a priority of one operating system over the other, such as assigning priority to a resident or local operating system over an emulated operating system.

As an alternative or in addition to sharing a processor, the different operating systems share a display in the vehicle. For example, a display of a navigation receiver or other platform within the vehicle is shared. Both operating systems are operable to control the display. The control by an emulated operating system may be provided through functionality of the primary operating system. Alternatively, the emulated operating system directly controls the display. By running different applications using different operating systems, image information is generated substantially simultaneously. The image information is provided to the display for sharing the display as a function of time or spatial area. The user selects the display format, such as selecting between an image from a navigation program and an image from a different program. Alternatively, the selection is of the relative sizes of displays or location of displays of the different images from the different applications or operating systems.

In another implementation of the process of FIG. 3, a second program is emulated in act 42 as a virtual terminal program. The virtual terminal program is operable to generate an image for display pursuant to a format, such a standard format, to be used by one or more remote sources of information. The virtual terminal program is operable to receive display information from the remote sources. In one embodiment, the virtual terminal program operates pursuant to ISO-11783, but other standard or proprietary formats may be provided. The virtual terminal program is integrated on a platform for use with a different application. For example, the virtual terminal program is emulated on a platform used for navigation applications. The platform hosts the navigation applications as well as emulates virtual terminal functionality. The navigation platform or device is connected to one or more additional devices or platforms. The connection allows communications pursuant to the virtual terminal format of display information. The navigation platform or other platform emulating the virtual terminal generates images for the resident applications as well as images pursuant to the virtual terminal program. The images are generated in sequence or at substantially the same time for display in an integrated image or in different areas of a same display. In alternative embodiments, the virtual terminal includes a processor for emulating other applications.

In act 44, the display is shared to display information from a navigation program or other programs substantially simultaneously with information from a virtual terminal program. Display information from different sources remote to a hosting platform is routed to the display at different times by the virtual terminal program. Information from a resident application, such as a navigation application, is displayed with information from the virtual terminal at a substantially same or at different times. For example, real time images are generated on a display as a function of a steering guidance program, an as applied map generator program, a variable rate map generator program, a cut-fill map generator program, combinations thereof or other navigation programs. In addition to real time images generated on the display as a function of position or navigation information, images associated with the virtual terminal program are also displayed. As another example, the image displayed transitions between images for different applications, such as an image for a navigation application and one or more possible channels or associated images for the virtual terminal program. In response to user input or alerts, an image currently displayed is switched to a different image or source of information.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method comprising:
   running a navigation program in a vehicle; and
   running an emulation program in the vehicle;
   wherein the vehicle is a farm implement, a mining vehicle or a construction vehicle, and wherein the emulation program is a farming, mining or construction application that is different than the navigation program;
   wherein running the navigation program comprises running a steering guidance program, as-applied map generator program, variable rate map generator program, a cut-fill map generator program or combinations thereof, the running operable to generate real-time images on a display in the vehicle as a function of a position of the vehicle; and
   wherein the emulation program is a virtual terminal program operable to generate an image for a display, the virtual terminal program operable to receive display information from one or more sources.

2. The method of claim 1 wherein running the navigation program comprises automatically steering the vehicle as a function of the navigation program and wherein running the emulation program comprises operating a component of the vehicle other than steering.

3. The method of claim 1 wherein running the navigation program and running the emulation program are performed by a shared processor substantially simultaneously.

4. The method of claim 1 wherein running the navigation program outputs first display information and wherein running the emulation program outputs second display information;
further comprising:
sharing a display in the vehicle for the first and second display information.

5. The method of claim 1 wherein the navigation program runs with a first operating system, the emulation program runs with a second operating system substantially simultaneously with operation of the first operating system.

6. The method of claim 5 wherein the first operating system is a Linux or a Windows® operating system and the second operating system is a Pocket PC, WindowsCE® or Palm operating system.

7. The method of claim 5 further comprising:
assigning priority to the first operating system over the second operating system.

8. The method of claim 5 further comprising:
selecting on a display in the vehicle a first image from the navigation program or a second image from the emulation program in response to the user input.

9. The method of claim 5 wherein the first and second operating systems are both operable to control a display in the vehicle, and wherein running the navigation program and running the emulation program provide image information for the display substantially simultaneously.

10. The method of claim 1 wherein the emulation program runs at least partially on hardware shared by the navigation program.

11. The method of claim 1 wherein the emulation program is a virtual terminal program operable to generate an image for a display, the virtual terminal program operable to receive display information from one or more remote sources.

12. The method of claim 11 wherein the virtual terminal program operates pursuant to ISO 11783.

13. The method of claim 11 further comprising displaying information from the navigation program substantially simultaneously with information from the virtual terminal program.

14. The method of claim 11 further comprising transitioning between a first image for the navigation program and a second image for the virtual terminal program in response to user input.

15. The method of claim 11 further comprising transitioning between a first image for the navigation program and a second image for the virtual terminal program in response to an alert.

16. The method of claim 1 wherein the emulation program implements a virtual terminal or an operating system interface.

17. The method of claim 1 wherein the emulation program implements the interface characteristics of a program or device.

18. The method of claim 17 wherein the device is a virtual terminal.

19. The method of claim 17 wherein the device is a personal digital assistant (PDA).

20. The method of claim 1 wherein running the navigation program and running the emulation program comprise running on a navigation receiver, the emulation program operable to use navigation information from the navigation program.

21. A system comprising:
a vehicle;
a display in or on the vehicle;
a processor connected with the display, the processor operable to run a first navigation program; and
a second program which is an emulation program, the emulation program being operable to share the display with the first program;
wherein the vehicle is a farm vehicle, mining vehicle, or a construction vehicle, the first program is associated with a navigation program, and the second program is associated with a farming, mining or construction application different than the navigation program; and
wherein the first program is a steering guidance program, as-applied map generator program, variable rate map generator program, a cut-fill map generator program or combinations thereof operable to generate real-time images on the display as a function of position information.

22. The system of claim 21 wherein the first program is a first application which is operable to run on a first operating system, the second program is a second operating system, the processor is operable to run the first application, and the second operating system is operable to run a second application substantially simultaneously with the processor running the first application.

23. The system of claim 22 wherein the first operating system is a Linux or a Windows® operating system and the second operating system is a Pocket PC, WindowsCE®, or Palm operating system.

24. The system of claim 22 wherein the first operating system has priority over the second operating system.

25. The system of claim 22 further comprising a user input, the processor operable to select a display format on the display of the first application and the second application in response to the user input.

26. The system of claim 22 wherein the first and second operating systems are both operable to control the display, and the first and second applications are operable to share the display substantially simultaneously.

27. The system of claim 21 wherein the first program is a first application which is operable to run on a first operating system, the second program is a second operating system, and the processor is operable to secondarily host the second operating system while running the first operating system.

28. The system of claim 21 wherein the navigation program is an automated steering application, and the fanning, miffing or construction application is an application for operating a component of the farm vehicle, mining vehicle or construction vehicle other than steering.

29. The system of claim 21 wherein the second program is a virtual terminal program operable to generate an image for the display, the virtual terminal program operable to receive display information from one or more sources.

30. The system of claim 29 wherein the virtual terminal program operates pursuant to ISO 11783.

31. The system of claim 29 wherein the display is operable to display information from the first program substantially simultaneously with information from the virtual terminal program.

32. The system of claim 29 further comprising a user input, the processor operable to transition between a first image for the first program and a second image for the virtual terminal program in response to the user input.

33. The system of claim 21 wherein the processor is operable to transition between a first image for the first program and a second image for the virtual terminal program in response to an alert.

34. The system of claim 21 wherein the first program is a first application which is operable to run on a first operating system, the second program is a second operating system, and the processor is operable to run first and second applications for the first and second operating systems, respectively, substantially simultaneously, the emulation program being run on the processor.

35. The system of claim 21 wherein the emulation program is run on a different processor than the processor, and the first program and the emulation program are operable to share the display.

36. The system of claim 21 wherein the emulation program is also operable on the processor.

37. A system comprising:
a virtual terminal emulator and a navigation program on a same platform; and
a display operable in response to the virtual terminal emulator and the navigation program;
wherein the navigation program is operable to generate real-time images on the display as a function of a steering guidance program, an as-applied map generator program, a variable rate map generator program, a cut-fill map generator program or combinations thereof.

38. The system of claim 37 wherein the virtual terminal emulator is operable to route display information from different sources remote from the platform at different times to the display.

39. The system of claim 37 wherein the virtual terminal emulator is operable to pursuant to ISO 11783.

40. The system of claim 37 wherein the display is operable to display information from the application substantially simultaneously with information from the virtual terminal emulator.

41. The system of claim 37 wherein the platform is a navigation receiver.

42. The system of claim 37 wherein the display is operable to transition between a first image for the navigation program and a second image for the virtual terminal emulator in response to user input.

43. The system of claim 37 wherein the display is operable to transition between a first image for the navigation program and a second image for the virtual terminal emulator in response to an alert.

44. The system of claim 37 wherein the platform is a navigation platform running the virtual terminal emulator and the navigation program, and
wherein the navigation platform connects to one or more clients operable to provide display information in a format for the virtual terminal emulator.

45. A method comprising:
running a first program with a first operating system;
running a second program with a second operating system in real-time with the running of the first program;
wherein the first and second programs share a display, at least the first program associated with navigation;
wherein the first, the second or both of the first and second programs are associated with farming, mining, construction or combinations thereof; and
running the first and second programs on a farm vehicle, a mining vehicle or a construction vehicle, the first program being a navigation program, and the second program being associated with a farming, mining or construction application different than the navigation program.

46. The method of claim 45 wherein the display is in a vehicle, and wherein running the first program comprises processing position information of the vehicle, the position information being a function of radio navigation signals.

47. The method of claim 45 wherein running the second program with the second operating system comprises emulating the second operating system on the processor and wherein the first program is run on the processor.

48. The method of claim 45 wherein the first operating system is a Linux or a Windows® operating system and the second operating system is a Pocket PC, WindowsCE® or Palm operating system.

49. The method of claim 45 further comprising assigning priority to the first operating system over the second operating system.

50. The method of claim 45 further comprising selecting a display format on the display of the first program relative to the second program in response to the user input.

51. The method of claim 45 wherein the first and second operating systems are both operable to control the display, and the first and second programs are operable to share the display substantially simultaneously.

52. The method of claim 45 wherein the processor hosts the second operating system while running the first operating system.

53. The method of claim 45 wherein the first and second operating systems also share a processor.

54. The method of claim 45 wherein the navigation program is an automated steering application, and the farming, mining or construction application is an application for operating a component of the farm implement, mining vehicle or construction vehicle other than steering.

* * * * *

UNITED STATES PATENT AND TRADEMARK OFFICE
CERTIFICATE OF CORRECTION

PATENT NO. : 7,548,804 B2  Page 1 of 1
APPLICATION NO. : 11/134166
DATED : June 16, 2009
INVENTOR(S) : Matthew J. Rossow et al.

It is certified that error appears in the above-identified patent and that said Letters Patent is hereby corrected as shown below:

In column 14, claim 28, line 44, after "steering application, and the" delete "fanning, miffing" and substitute --farming, mining-- in its place.

Signed and Sealed this

Eighth Day of September, 2009

David J. Kappos
*Director of the United States Patent and Trademark Office*